(12) United States Patent
Takeuchi et al.

(10) Patent No.: US 9,199,852 B2
(45) Date of Patent: Dec. 1, 2015

(54) METHOD OF MANUFACTURING SILICA PARTICLE DISPERSION

(75) Inventors: Sakae Takeuchi, Kanagawa (JP);
Shinichiro Kawashima, Kanagawa (JP);
Hiroyoshi Okuno, Kanagawa (JP);
Hideaki Yoshikawa, Kanagawa (JP);
Yasuo Kadokura, Kanagawa (JP);
Shunsuke Nozaki, Kanagawa (JP);
Yuka Zenitani, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 748 days.

(21) Appl. No.: 13/359,027

(22) Filed: Jan. 26, 2012

(65) Prior Publication Data
US 2013/0075652 A1 Mar. 28, 2013

(30) Foreign Application Priority Data

Sep. 26, 2011 (JP) .................................. 2011-209275

(51) Int. Cl.
*C01B 33/146* (2006.01)
*C01B 33/18* (2006.01)

(52) U.S. Cl.
CPC ............... *C01B 33/146* (2013.01); *C01B 33/18* (2013.01)

(58) Field of Classification Search
None
See application file for complete search history.

(56) References Cited

U.S. PATENT DOCUMENTS

| 5,486,420 | A | * | 1/1996 | Nishihara et al. | 428/405 |
|---|---|---|---|---|---|
| 6,316,155 | B1 | * | 11/2001 | Kudo et al. | 430/108.3 |
| 6,521,290 | B1 | * | 2/2003 | Kudo et al. | 427/214 |
| 6,770,130 | B2 | * | 8/2004 | Kato et al. | 106/481 |
| 6,855,759 | B2 | * | 2/2005 | Kudo et al. | 524/261 |
| 7,083,888 | B2 | * | 8/2006 | Kudo et al. | 430/108.15 |
| 2003/0035888 | A1 | | 2/2003 | Eriyama et al. | |
| 2006/0112860 | A1 | * | 6/2006 | Yoshitake et al. | 106/490 |
| 2007/0003701 | A1 | * | 1/2007 | Yoshitake et al. | 427/387 |
| 2008/0268362 | A1 | * | 10/2008 | Kudo | 430/108.1 |
| 2011/0318584 | A1 | * | 12/2011 | Yoshikawa et al. | 428/404 |
| 2011/0319647 | A1 | * | 12/2011 | Yoshikawa et al. | 556/478 |

FOREIGN PATENT DOCUMENTS

| JP | A-62-091429 | 4/1987 |
|---|---|---|
| JP | A-62-207723 | 9/1987 |
| JP | A-01-278413 | 11/1989 |
| JP | 2001-213617 A | 8/2001 |
| JP | 2008-273757 A | 11/2008 |

OTHER PUBLICATIONS

Mar. 17, 2015 Office Action issued in Japanese Application No. 2011-209275.
Aug. 4, 2015 Office Action issued in Japanese Application No. 2011-209275.

* cited by examiner

*Primary Examiner* — Robert S Loewe
(74) *Attorney, Agent, or Firm* — Oliff PLC

(57) ABSTRACT

A method of manufacturing a silica particle dispersion, includes preparing a silica particle dispersion containing silica particles and a solvent, primary concentrating the silica particle dispersion, adding a hydrophobizing treatment agent to the silica particle dispersion after the primary concentrating, and secondary concentrating the silica particle dispersion after the adding.

17 Claims, No Drawings

METHOD OF MANUFACTURING SILICA PARTICLE DISPERSION

CROSS-REFERENCE TO RELATED APPLICATIONS

This application is based on and claims priority under 35 USC 119 from Japanese Patent Application No. 2011-209275 filed Sep. 26, 2011.

BACKGROUND

Technical Field

The present invention relates to a method of manufacturing a silica particle dispersion.

SUMMARY

According to a first aspect of the invention, there is provided a method of manufacturing a silica particle dispersion, including preparing a silica particle dispersion containing silica particles and a solvent, primary concentrating the silica particle dispersion, adding a hydrophobizing treatment agent to the silica particle dispersion after the primary concentrating, and secondary concentrating the silica particle dispersion after the adding.

DETAILED DESCRIPTION

An exemplary embodiment of the invention will be described in detail.

The method of manufacturing a silica particle dispersion according to the exemplary embodiment has a preparation process for preparing a silica particle dispersion containing silica particles and a solvent, and a concentrating process for concentrating the silica particle dispersion.

In addition, the concentrating process has a primary concentrating process for concentrating the silica particle dispersion, an addition process for adding a hydrophobizing treatment agent to the silica particle dispersion after the primary concentrating process, and a secondary concentrating process for concentrating the silica particle dispersion after the addition process.

Here, in the related art, when a concentrating treatment of a silica particle dispersion (that is, a treatment in which a solvent is removed so that the solid content concentration of silica particles is increased) was carried out, coarse powder (coarse particles) is likely to be generated. This is considered to be because the distance between the silica particles is decreased as the solid content concentration of the silica particle dispersion is increased by the concentrating treatment, and therefore agglomeration between the particles or condensation of silanol groups occurs.

In contrast to the above, in the method of manufacturing a silica particle dispersion according to the exemplary embodiment, a silica particle dispersion having a small amount of coarse powder and a high solid content concentration may be obtained by undergoing the primary concentrating process for concentrating a silica particle dispersion, the addition process for adding a hydrophobizing treatment agent to the silica particle dispersion after the primary concentrating process, and the secondary concentrating process for concentrating the silica particle dispersion after the addition process, that is, by adding the hydrophobizing treatment agent to the silica particle dispersion in the step of the concentrating process.

The reason thereof is not clear, but is considered to be as follows.

Firstly, in a case in which the hydrophobizing treatment agent is added, it is considered that a hydrophobizing treatment is carried out on the surfaces of the silica particles, and the surface energies of the silica particles are lowered. It is considered that the solid content concentration of the silica particles is increased by the concentrating treatment due to the decrease in the surface energies at the surfaces of the silica particles so that agglomeration between the particles or condensation of silanol groups does not easily occur even when the distance between the silica particles is decreased.

From the above, it is considered that, in the method of manufacturing a silica particle dispersion according to the exemplary embodiment, a silica particle dispersion having a small amount of coarse powder and a high solid content concentration may be obtained.

In addition, in the method of manufacturing a silica particle dispersion according to the exemplary embodiment, a rapid concentrating treatment is realized.

When the solid content concentration of the silica particle dispersion is increased by the concentrating treatment, it is likely that coarse powder is generated and gelatinized at the same time. Then, the viscosity of the silica particle dispersion is increased, and sometimes the concentrating treatment rate may be degraded. Particularly, in a case in which pressure filtration or heating distillation is carried out as the concentrating treatment, when the viscosity is increased, it is highly likely that degradation of the rate of filtration or distillation, or a phenomenon in which a cake layer is accumulated such that filtration may not proceed remarkably occurs, and the concentrating treatment rate is likely to be degraded.

In contrast to the above, due to the same reasons as above, in the method of manufacturing a silica particle dispersion according to the exemplary embodiment, the increase in the viscosity of the silica particle dispersion becomes easily suppressed by the concentrating treatment, and therefore a rapid concentrating treatment is realized.

Hereinafter, the respective processes will be described in detail.

—Dispersion Preparation Process—

The dispersion preparation process is for preparing a silica particle dispersion containing silica particles and a solvent (for example, a solvent including an alcohol and water).

Specifically, in the present process, for example, a silica particle dispersion is produced and thus prepared by a wet-type method (for example, the sol-gel method or the like). Particularly, the silica particle dispersion is preferably produced by the sol-gel method as the wet-type method, specifically, by causing a reaction (hydrolysis reaction, condensation reaction) of tetraalkoxysilane in the presence of an alkali solution having an alkali solvent added to a solvent of an alcohol and water so as to generate silica particles.

Meanwhile, the silica particle may have any of a spherical shape and an irregular shape.

The sol-gel method that generates the silica particles may be a well-known method, and examples thereof include the following method (hereinafter referred to as the present method of manufacturing silica particles in the description).

The present method of manufacturing silica particles has a process for preparing an alkali catalyst solution including an alkali catalyst at a concentration of from 0.6 mol/L to 0.85 mol/L (or from about 0.6 mol/L to about 0.85 mol/L) in a solvent including an alcohol (hereinafter sometimes referred to as the "alkali catalyst solution preparation process") and a process for supplying tetraalkoxysilane to the alkali catalyst solution and supplying from 0.1 mol to 0.4 mol (or from about 0.1 mol to about 0.4 mol) of an alkali catalyst to 1 mol of the total supply amount of the tetraalkoxysilane supplied for one minute (hereinafter sometimes referred to as the "particle generation process").

That is, the present method of manufacturing silica particles is a method of generating silane particles by causing a reaction of the tetraalkoxysilane while supplying the tetraalkoxysilane, which is a raw material, and, separately, the alkali catalyst, which is a catalyst, in the presence of an alcohol including the alkali catalyst at the above concentration respectively in the above relationship.

In the present method of manufacturing silica particles, a smaller amount of coarse powder is generated, and irregular-shaped silica particles may be obtained by the above method. The reason thereof is not clear, but is considered to be as follows.

Firstly, when the alkali catalyst solution including the alkali catalyst is prepared in the solvent including an alcohol, and the tetraalkoxysilane and the alkali catalyst are supplied respectively to the solution, the tetraalkoxysilane supplied to the alkali catalyst solution is reacted such that nucleus particles are likely to be generated. At this time, it is considered that, when the concentration of the alkali catalyst in the alkali catalyst solution is in the above range, generation of coarse powder, such as secondary agglomerate, is suppressed, and irregular-shaped nucleus particles are generated. This is because it is considered that the alkali catalyst does not act only as a catalyst but is also coordinated on the surfaces of the nucleus particles being generated so as to contribute to the shape and dispersion stability of the nucleus particles; however, when the amount thereof is in the above range, the alkali catalyst does not uniformly cover the surfaces of the nucleus particles (that is, the alkali catalyst is unevenly distributed on and adhered to the surfaces of the nucleus particles), and therefore, while the dispersion stability of the nucleus particles is maintained, the surface tension and chemoaffinity of the nucleus particles are partially biased, and the irregular-shaped nucleus particles are generated.

In addition, when the tetraalkoxysilane and the alkali catalyst are continuously supplied respectively, the generated nucleus particles are grown by the reaction of the tetraalkoxysilane, and silica particles are obtained. Here, when the tetraalkoxysilane and the alkali catalyst are supplied while the supply amounts thereof are maintained in the above relationship, it is considered that generation of coarse powder, such as secondary agglomerate, is suppressed, and the irregular-shaped nucleus particles are grown while the irregular shape is maintained, and, consequently, irregular-shaped silica particles are generated. This is considered that, when the supply amounts of the tetraalkoxysilane and the alkali catalyst are controlled to have the above relationship, while the dispersion of the nucleus particles is maintained, the tension on the surfaces of the nucleus particles and partial bias of the chemoaffinity are maintained, and therefore the nucleus particles are grown while the irregular shape is maintained.

From the above, it is considered that, in the present method of manufacturing silica particles, only a small amount of coarse powder is generated, and irregular-shaped silica particles may be obtained.

Meanwhile, the irregular-shaped silica particles refer to silica particles having an average degree of circularity of from 0.5 to 0.85 (or from about 0.5 to about 0.85).

In addition, in the present method of manufacturing silica particles, since it is considered that irregular-shaped nucleus particles are generated, and the nucleus particles are grown while the irregular shape is maintained, thereby generating silica particles, it is considered that the morphological stability against mechanical loads is favorable, and irregular-shaped silica particles having a substantially uniform shape distribution may be obtained.

In addition, in the present method of manufacturing silica particles, since it is considered that the generated irregular-shaped nucleus particles are grown while the irregular shape is maintained so as to produce silica particles, it is considered that silica particles that are strong against mechanical load and are not easily collapsed may be obtained.

In addition, in the present method of manufacturing silica particles, since the tetraalkoxysilane and the alkali catalyst are supplied respectively to the alkali catalyst solution, particles are generated by causing a reaction of the tetraalkoxysilane, and therefore the total used amount of the alkali catalyst becomes smaller than in a case in which irregular-shaped silica particles are manufactured by the sol-gel method of the related art, and, consequently, a process for removing the alkali catalyst may not be required. This is particularly advantageous in a case in which the silica particles are applied to products for which a high purity is required.

Firstly, the alkali catalyst solution preparation process will be described.

In the alkali catalyst solution preparation process, a solvent including an alcohol is prepared, and an alkali catalyst is added thereto, thereby preparing an alkali catalyst solution.

The solvent including an alcohol may be a pure alcohol solvent, and may be, according to necessity, a mixed solvent with another solvent, such as water, a ketone (for example, acetone, methyl ethyl ketone, methyl isobutyl ketone, or the like), a cellosolve (for example, methyl cellosolve, ethyl cellosolve, butyl cellosolve, cellosolve acetate, or the like), an ether (for example, dioxane, tetrahydrofuran, or the like), or the like. In the case of the mixed solvent, the amount of alcohol with respect to the other solvent is preferably 80% by mass or more (desirably 90% by mass or more).

Meanwhile, examples of the alcohol include lower alcohols, such as methanol and ethanol.

On the other hand, the alkali catalyst is a catalyst for promoting the reaction (hydrolysis reaction, condensation reaction) of the tetraalkoxysilane, examples thereof include basic catalysts, such as ammonia, urea, monoamine, tertiary ammonium salts, and the like, and ammonia is particularly desirable.

The concentration (content) of the alkali catalyst is from 0.6 mol/L to 0.85 mol/L, desirably from 0.63 mol/L to 0.78 mol/L, and more desirably from 0.66 mol/L to 0.75 mol/L.

When the concentration of the alkali catalyst is less than 0.6 mol/L, the dispersibility of nucleus particles becomes unstable during a step in which the generated nucleus particles grow, coarse powder, such as secondary agglomerate, is generated or gelatinized, and therefore there are cases in which the particle size distribution is deteriorated.

On the other hand, when the concentration of the alkali catalyst is more than 0.85 mol/L, the stability of the generated nucleus particles becomes excessive, truly spherical particles are generated, irregular-shaped nucleus particle may not be obtained, and, consequently, irregular-shaped silica particles may not be obtained.

Meanwhile, the concentration of the alkali catalyst is a concentration with respect to the alcohol catalyst solution (the alkali catalyst+the solvent including an alcohol).

Next, the particle generation process will be described.

The particle generation process is a process in which the tetraalkylsilane and the alkali catalyst are respectively supplied to the alkali catalyst solution, and a reaction (hydrolysis reaction, condensation reaction) of the tetraalkoxysilane is caused, thereby generating silica particles in the alkali catalyst solution.

In the particle generation process, nucleus particles are generated by the reaction of the tetraalkoxysilane at the initial phase of the supply of the tetraalkoxysilane (nucleus particle generation phase), and then the nucleus particles are grown (nucleus particle growth phase), thereby generating silica particles.

Examples of the tetraalkoxysilane supplied to the alkali catalyst solution include tetramethoxysilane, tetraethoxysilane, tetrapropoxysilane, tetramethoxysilane, and the like, but tetramethoxysilane and tetraethoxysilane are preferred in terms of the controllability of the reaction rate or the shape, particle diameter, particle size distribution, and the like of the obtained silica particles.

The supply amount of the tetraalkoxysilane is, for example, preferably from 0.001 mol/(mol·min) to 0.01 mol/(mol·min), desirably from 0.002 mol/(mol·min) to 0.009 mol/(mol·min), and more desirably from 0.003 mol/(mol·min) to 0.008 mol/(mol·min) with respect to the mole number of the alcohol in the alkali catalyst solution.

When the supply amount of the tetraalkoxysilane is in the above range, only a small amount of coarse powder is generated, and irregular-shaped silica particles are easily generated.

Meanwhile, the supply amount of the tetraalkoxysilane indicates the mole number of the tetraalkoxysilane supplied for one minute to 1 mole of the alcohol in the alkali catalyst solution.

Meanwhile, the alkali catalyst supplied to the alkali catalyst solution includes substances as exemplified above. The alkali catalyst being supplied may be the same type as an alkali catalyst that is previously included in the alkali catalyst solution or a different type, but the same type catalyst is preferred.

The supply amount of the alkali catalyst is set to from 0.1 mol to 0.4 mol, desirably from 0.14 mol to 0.35 mol, and more desirably from 0.18 mol to 0.3 mol with respect to 1 mol of the total supply amount of the tetraalkoxysilane supplied for one minute.

When the supply amount of the alkali catalyst is less than 0.1 mol, the dispersibility of nucleus particles becomes unstable during the step in which the generated nucleus particles grow, coarse powder, such as secondary agglomerate, is generated or gelatinized, and therefore there are cases in which the particle size distribution is deteriorated.

On the other hand, when the supply amount of the alkali catalyst is more than 0.4 mol, the stability of the generated nucleus particles become excessive, the nucleus particles are grown into a spherical shape in the nucleus particle growth phase even when irregular-shaped nucleus particles are grown in the nucleus particle generation phase, and irregular-shaped silica particles may not be obtained.

Here, in the particle generation process, the tetraalkoxysilane and the alkali catalyst are respectively supplied to the alkali catalyst solution, but the supplying method may be in a continuous supplying mode or an intermittent supplying mode.

In addition, in the particle generation process, the temperature of the alkali catalyst solution (the temperature during the supply) is, for example, preferably from 5° C. to 50° C. (or from about 5° C. to about 50° C.), and desirably in a range of from 15° C. to 40° C.

In the present method of manufacturing silica particles, silica particles are obtained by undergoing the above processes.

In the process for preparing silica particles as described above, for example, in a case in which silica particles are obtained by a wet-type method, silica particles are obtained in a state of a dispersion in which the silica particles are dispersed in a solvent (silica particle dispersion).

—Concentrating Process—

The concentrating process is carried out by undergoing the primary concentrating process for concentrating the silica particle dispersion, the addition process for adding a hydrophobizing treatment agent to the silica particle dispersion after the primary concentrating process, and the secondary concentrating process for concentrating the silica particle dispersion after the addition process.

Specifically, in the present process, for example, 1) it is allowed that the primary concentrating process and the secondary concentrating process are continuously carried out (that is, the concentrating processes are continuously carried out without being stopped), and then the addition process for adding a hydrophobizing treatment agent to the silica particle dispersion is carried out, or 2) it is allowed that the primary concentrating process is carried out, stopped for a while, the addition process for adding a hydrophobizing treatment agent to the silica particle dispersion is carried out, and, again, the secondary concentrating process is carried out.

Firstly, the primary concentrating process and the secondary concentrating process will be described.

In the primary concentrating process and the secondary concentrating process, a treatment for removing the solvent of the silica particle dispersion and increasing the silica particle solid content concentration in the dispersion is carried out.

Specifically, in the primary concentrating process and the secondary concentrating process, for example, well-known methods, such as 1) a method in which the solvent is removed through filtration, centrifugation, distillation, or the like so as to concentrate the dispersion, 2) a method in which the solvent is removed by directly heating the dispersion using a fluid-bed dryer, a spray dryer, or the like so as to concentrate the dispersion, or the like, is employed.

Here, the temperature of the concentrating treatment is not particularly limited, but is desirably 200° C. or lower. When the temperature is higher than 200° C., bonding of primary particles or generation of coarse particles is likely to occur due to condensation of silanol groups that remain on the surfaces of the silica particle.

Next, the addition process will be described.

In the addition process, a hydrophobizing treatment agent is added after the primary concentrating process.

The addition process is preferably started before coarse powder is generated due to an increase in the solid content concentration of the silica particle dispersion by the primary concentrating process.

That is, the addition process is preferably carried out after the primary concentrating process is carried out such that the viscosity of the silica particle dispersion becomes from 20 mPa·s to 1000 mPa·s (desirably from 100 mPa·s to 1000 mPa·s, and more desirably from 300 mPa·s to 1000 mPa·s). In other words, the primary concentrating process is preferably carried out until the viscosity of the silica particle dispersion becomes in the above range.

Thereby, a silica particle dispersion having a small amount of coarse powder and a high solid content concentration may be easily obtained.

When the viscosity of the silica particle dispersion is too low, the solid content concentration of the silica particles is too low, and therefore the hydrophobizing treatment agent being added is easily diluted, and the added amount needs to be excessive.

On the other hand, when the viscosity of the silica particle dispersion is too high, coarse powder (coarse particles) becomes likely to be generated due to agglomeration between the silica particles.

Meanwhile, the viscosity of the silica particle dispersion is a value measured at a temperature of 25° C. using a viscotester [VT-04F] (manufactured by Rion Co., Ltd.).

Examples of the hydrophobizing treatment agent include well-known organic silicon compounds having an alkyl group (for example, a methyl group, an ethyl group, a propyl group, a butyl group, or the like), and specific examples thereof include silane compounds (for example, silane compounds, such as methyltrimethoxysilane, dimethyldimethoxysilane, trimethylchlorosilane, and trimethylmethoxysilane, hexamethyldisilazane, tetramethyldisilazane, or the like). The hydrophobizing treatment agent may be used singly, or plural agents may be used.

Among the hydrophobizing treatment agents, organic silicon compounds having a trimethyl group, such as trimethylmethoxysilane and hexamethyldisilazane, are preferred.

The added amount of the hydrophobizing treatment agent is not particularly limited, but is preferably from 1% by mass to 60% by mass (or from about 1% by mass to about 60% by mass), desirably from 5% by mass to 40% by mass, and more desirably from 10% by mass to 30% by mass with respect to the silica particles.

Here, when the hydrophobizing treatment agent is added, a hydrophobizing treatment of the silica particles is carried out by the reaction of the hydrophobizing treatment agent, but the temperature condition thereof (the temperature condition during the reaction) is, for example, preferably from 30° C. to 80° C. (or from about 30° C. to about 80° C.), desirably from 15° C. to 65° C., and more desirably from 30° C. to 50° C.

Meanwhile, after the addition of the hydrophobizing treatment agent, the temperature condition may be maintained even in the secondary concentrating process, or the hydrophobizing treatment may be carried out separately before the secondary concentrating process as the temperature condition.

The silica particle dispersion is obtained by undergoing the concentrating process as described above.

Here, the solid content concentration of the silica particles in the obtained silica particle dispersion is, for example, preferably from 60% by mass to 80% by mass (or from about 60% by mass to about 80% by mass), desirably from 65% by mass to 75% by mass. That is, the concentrating process (secondary concentrating process) is preferably carried out until the solid content concentration of the silica particles becomes in the above range.

In addition, among the silica particles in the obtained silica particle dispersion, the lower the fraction of 1 μm or larger coarse particles, the more preferred, and the fraction of 1 μm or larger coarse particles is 20% by volume or less, preferably 5% by volume or less, and more preferably 1% by volume or less. When the fraction of 1 μm or larger coarse particles is more than 20% by volume, crushing or sieving and classification are required, and therefore the productivity tends to be deteriorated.

EXAMPLES

Hereinafter, the exemplary embodiment will be described in more detail using examples and comparative examples, but the exemplary embodiment is not limited to the examples. In addition, "parts" refers to "parts by mass" unless otherwise described.

Example 1

Producing of a Silica Particle Dispersion 600 parts of methanol and 100 parts of 10% ammonia water are fed in a 3 L glass reaction vessel having a metal stirring bar, a dropping nozzle (micro tube pump manufactured by TEFLON (registered trademark)), and thermometer, the two are stirred and mixed, thereby producing an alkali catalyst solution. The ratio of the ammonia catalyst amount to the $NH_3$ amount ($NH_3$ mol/(ammonia water+methanol)L) in the alkali catalyst solution at this time is 0.68 mol/L. Next, the temperature of the alkali catalyst solution is adjusted to 25° C., and the alkali catalyst solution is nitrogen-substituted. After that, while stirring the alkali catalyst solution, dropping of 450 parts of tetramethoxysilane (TMOS) at a supply amount of 15.0 g/min and 270 parts of the ammonia water having a catalyst ($NH_3$) concentration of 4.4% at a supply amount of 9.0 g/min is started at the same time, and continued for 30 minutes, thereby producing a silica particle dispersion 1.

The solid content concentration of the obtained silica particle dispersion 1 is 10% by mass. Meanwhile, the solid content concentration refers to the solid content concentration of the silica particles. This applies in the below.

(Concentrating of the Silica Particle Dispersion)

Firstly, while injecting 1200 parts of the silica particle dispersion 1 into the chamber of a pressure filtration device using a pump, the silica particle dispersion is primary-concentrated until the target solid content concentration and target viscosity (described in Table 1) of the silica particle dispersion are obtained. Then, 22 parts of hexamethyldisilazane (manufactured by Wako Pure Chemical Industries, Ltd., hereinafter referred to as HMDS) is added, maintained at a treatment temperature of 30° C. for a treatment time of 30 minutes, and, subsequently, second concentrating is carried out until the target solid content concentration and target viscosity (described in Table 1) of the silica particle dispersion are obtained.

After the second concentrating, the chamber of the pressure filtration device is left open to atmosphere, and the concentrated silica particle dispersion is taken out.

In the above manner, a silica particle dispersion having the target solid content concentration (described in Table 1) of the silica particles is obtained.

Examples 2 to 15

Concentrated silica particle dispersions are obtained in the same manner as in Example 1 except that conditions for the method for carrying out the primary concentrating and the secondary concentrating, the solid content concentration and viscosity of the silica particle dispersion after the primary concentrating, the type, added amount (the amount added to the silica particles), and treatment temperature of the surface treatment agent being added, the solid content concentration and viscosity of the silica particle dispersion after the secondary concentrating are changed.

Comparative Example 1

The silica particle dispersion 1 is heated and depressurized so as to be concentrated until the solid content concentration becomes 30% by mass, then, 28 KHz ultrasonic waves are irradiated, and the silica particle dispersion is further concentrated, thereby producing a silica sol.

Meanwhile, in the present comparative example, the fraction of coarse particles is approximately 1.0%, but the solid content concentration is approximately 50% by mass.

(Fraction of Coarse Particles)
—Coarse Particle (Coarse Particle) Fraction—

The fraction of coarse particles is measured using an LS Coulter, and obtained as the fraction of 1 μm or larger particles. A smaller fraction of coarse particles is more preferred, and the fraction of 1 μm or larger particles is preferably 20% by volume or less, preferably 5% by volume or less, and more preferably 1% by volume or less.

ity, and then the hydrophobizing treatment agent is added to the silica particle dispersion, compared with the other examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

TABLE 1

| | Method of concentrating silica particle dispersion | | Silica particle dispersion after primary concentrating | | Addition of hydrophobizing treatment agent to silica particle dispersion | | | Silica partcle dispersion after secondary concentrating | | |
|---|---|---|---|---|---|---|---|---|---|---|
| | Primary concentrating | Secondary concentrating | Solid content concentration (% by mass) | Viscosity (mPa-s) | Type | Added amount (% by mass) | Treatment temperature (° C.) | Solid content concentration (% by mass) | Coarse particle fraction (%) | Viscosity (mPa-s) |
| Example 1 | Pressure filtration | Pressure filtration | 15 | 20 | HMDS | 30 | 30 | 63 | 0.1 | 600 |
| Example 2 | Pressure filtration | Pressure filtration | 20 | 50 | HMDS | 30 | 30 | 65 | 0.1 | 600 |
| Example 3 | Pressure filtration | Pressure filtration | 25 | 70 | HMDS | 20 | 30 | 65 | 0.2 | 620 |
| Example 4 | Pressure filtration | Pressure filtration | 30 | 100 | HMDS | 20 | 30 | 66 | 0.5 | 625 |
| Example 5 | Pressure filtration | Pressure filtration | 45 | 300 | HMOS | 10 | 30 | 68 | 0.8 | 620 |
| Example 6 | Pressure filtration | Pressure filtration | 50 | 400 | HMDS | 8 | 30 | 70 | 1.0 | 650 |
| Example 7 | Heating and depressurization | Heating and depressurization | 55 | 750 | HMDS | 8 | 30 | 70 | 4.5 | 760 |
| Example 8 | Centrifugation | Centrifugation | 65 | 850 | HMDS | 5 | 30 | 73 | 4.8 | 850 |
| Example 9 | Pressure filtration | Pressure filtration | 68 | 980 | HMDS | 5 | 30 | 76 | 4.9 | 970 |
| Example 10 | Pressure filtration | Pressure filtration | 30 | 100 | Methyltrimethoxysilane | 8 | 30 | 65 | 1.5 | 630 |
| Example 11 | Pressure filtration | Pressure filtration | 45 | 300 | Methyltrimethoxysilane | 5 | 30 | 67 | 2.0 | 645 |
| Example 12 | Pressure filtration | Pressure filtration | 50 | 400 | Methyltrimethoxysilane | 3 | 30 | 70 | 2.8 | 660 |
| Example 13 | Pressure filtration | Pressure filtration | 30 | 100 | Dimethyldimethoxysilane | 10 | 30 | 64 | 1.3 | 620 |
| Example 14 | Pressure filtration | Pressure filtration | 45 | 300 | Dimethyldimethoxysilane | 7 | 30 | 68 | 1.8 | 640 |
| Example 15 | Pressure filtration | Pressure filtration | 50 | 400 | Dimethyldimethoxysilane | 5 | 30 | 69 | 2.5 | 655 |
| Comparative Example 1 | Heating and depressurization | Heating and depressurization | 30 | 100 | — | — | — | 50 | 1.0 | 750 |

It is found from the above results that a silica particle dispersion having a small fraction of coarse particles (that is, a small amount of coarse powder) and a high solid content concentration may be obtained in the example compared with the comparative examples.

Particularly, it is also found that a silica particle dispersion having a small fraction of coarse particles (that is, a small amount of coarse powder) and a high solid content concentration may be obtained in Examples 1 to 6, in which the primary concentrating is carried out to an appropriate viscos-

What is claimed is:
1. A method of manufacturing a silica particle dispersion, comprising:
preparing a silica particle dispersion containing silica particles and a solvent,
primary concentrating the silica particle dispersion,
adding a hydrophobizing treatment agent to the silica particle dispersion after the primary concentrating, and secondary concentrating the silica particle dispersion after the adding, wherein the primary concentrating is carried out until the viscosity of the silica particle dispersion becomes from about 100 mPa·s to about 1000 mPa·s, and then the adding is carried out.

2. The method of manufacturing a silica particle dispersion according to claim 1, wherein the preparing of the silica particle dispersion comprises preparing an alkali catalyst solution comprising an alkali catalyst in a solvent including an alcohol, and then supplying tetraalkoxysilane and additional alkali catalyst to the alkali catalyst solution.

3. The method of manufacturing a silica particle dispersion according to claim 2, wherein the concentration of the alkali catalyst solution is from about 0.6 mol/L to about 0.85 mol/L.

4. The method of manufacturing a silica particle dispersion according to claim 2, wherein the supply amount of the additional alkali catalyst is from about 0.1 mol to about 0.4 mol with respect to 1 mol of the total supply amount of the tetraalkoxysilane.

5. The method of manufacturing a silica particle dispersion according to claim 2, wherein the alcohol includes any of methanol and ethanol.

6. The method of manufacturing a silica particle dispersion according to claim 2, wherein the tetraalkoxysilane includes any of tetramethoxysilane and tetraethoxysilane.

7. The method of manufacturing a silica particle dispersion according to claim 2, wherein the alkali catalyst is ammonia.

8. The method of manufacturing a silica particle dispersion according to claim 2, wherein the temperature of the alkali catalyst solution is from about 5° C. to about 50° C. in the preparing of the alkali catalyst solution.

9. The method of manufacturing a silica particle dispersion according to claim 1, wherein the temperature of the primary concentrating and the secondary concentrating is 200° C. or lower.

10. The method of manufacturing a silica particle dispersion according to claim 1, wherein the hydrophobizing treatment agent is an organic silicon compound having an alkyl group.

11. The method of manufacturing a silica particle dispersion according to claim 10, wherein the organic silicon compound having an alkyl group is a silane compound.

12. The method of manufacturing a silica particle dispersion according to claim 11, wherein the silane compound includes any of trimethylmethoxysilane and hexamethyldisilazane.

13. The method of manufacturing a silica particle dispersion according to claim 1, wherein the added amount of the hydrophobizing treatment agent is from about 1% by mass to about 60% by mass with respect to the silica particles.

14. The method of manufacturing a silica particle dispersion according to claim 1, wherein the reaction temperature after the hydrophobizing treatment agent is added is from about 30° C. to about 80° C.

15. The method of manufacturing a silica particle dispersion according to claim 1, wherein the solid content concentration of the silica particles after the secondary concentrating is from about 60% by mass to about 80% by mass.

16. The method of manufacturing a silica particle dispersion according to claim 1, wherein the average degree of circularity is from about 0.5 to about 0.85.

17. The method of manufacturing a silica particle dispersion according to claim 1, wherein the fraction of 1 μm or larger coarse particles is 20% by volume or less.

* * * * *